Jan. 19, 1932.  H. L. BREDOUW  1,842,067

GROUND SPEED AND COURSE INDICATOR

Filed Oct. 6, 1928

INVENTOR.
Homer L. Bredouw,
BY Arthur C. Brown
ATTORNEY

Patented Jan. 19, 1932

1,842,067

UNITED STATES PATENT OFFICE

HOMER L. BREDOUW, OF KANSAS CITY, MISSOURI

GROUND SPEED AND COURSE INDICATOR

Application filed October 6, 1928. Serial No. 310,863.

My invention relates to course finders and more particularly to means and methods for indicating positions and speeds of an airplane, the principal object of the invention being to assist the aviator in determining the ground speed of his plane.

In air travel, large distances are covered in relatively short periods and maps large enough for easy reading by the aviator while he is operating his machine, would be cumbersome and inconvenient to install and use.

A particular object of the invention therefore is to provide the map data for an aviator's course on a strip, to move the strip synchronously with the passage of the aviator over the territory indicated on the map, to indicate the position of the plane in relation to the prescribed course, and to adapt an indicator for registry with points on the map whereby the aviator may at a glance estimate his position and his relation to the course.

One of the troublesome problems in aviation is the estimation of the relation between the rate at which an airplane is passing from one point to another, and being commonly designated the ground speed; the aviator having means for noting the air speed. An aviator may be moving at an air speed of 150 miles an hour while actually progressing from one point on the ground to another point at 100 miles an hour, because of a head wind that reduces his ground speed. Conversely, the ground speed may be 150 miles an hour while the air speed is 100 miles an hour, when the wind assists progress.

An aviator may have supplied his tank with fuel for a jump of 100 miles, the supply not being sufficient to carry him 100 miles against a head wind. At present determination of the ground speed involves many observations and mental computations.

Further objects of the invention therefore are to enable the aviator to keep an accurate check of ground speed; to provide an indicator of ground speed which may be quickly and easily adjusted upon change of air speed, and to combine a ground speed indicator with an indicator adapted to disclose the relation of the actual course of the aviator to a prescribed course.

In accomplishing these and other objects of the invention, I have provided improved details of structure, the preferred forms of which are illustrated in the accompanying drawings, wherein.

Figure 1:
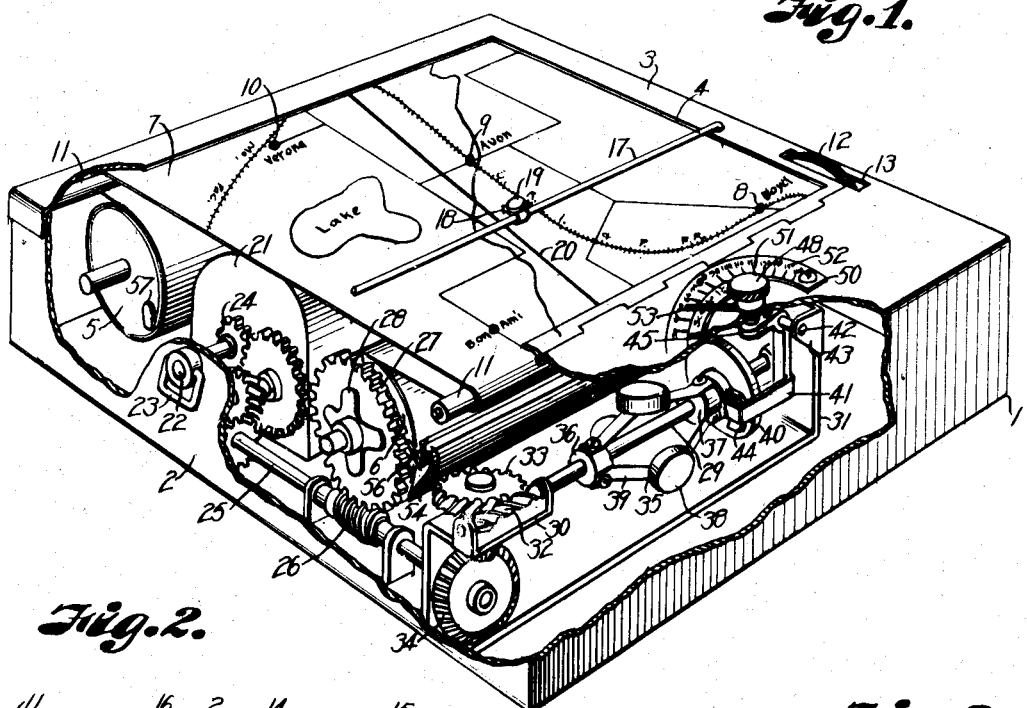
Fig. 1 is a perspective view of an air travel indicating device embodying my invention, the walls of the housing being broken away to disclose operating elements.
Figure 2:
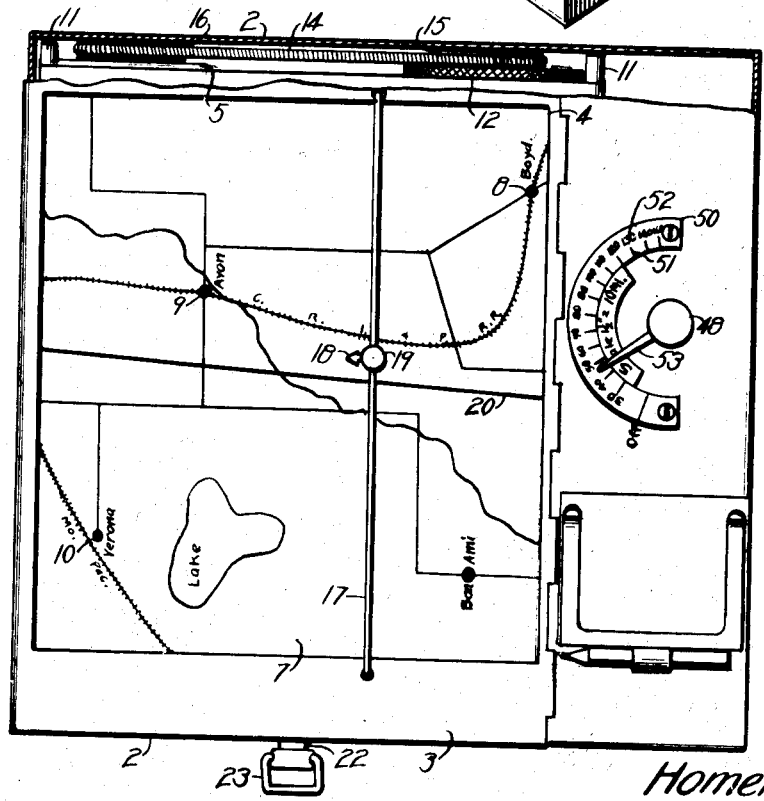
Fig. 2 is a plan view of the device, a portion of the upper wall being broken away to disclose interior structure.
Figure 3:
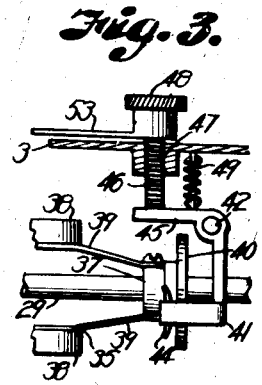
Fig. 3 is an enlarged detailed perspective view of a governor brake, the housing top, governor and governor shaft being shown fragmentarily and partly in section.
Figure 4:
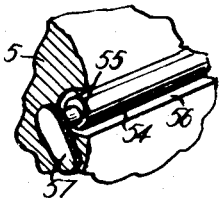
Fig. 4 is an enlarged detail fragmentary view of the outer end of the strip supporting cylinder and means for attaching the strip to the cylinder.

Referring in detail to the drawings:

1 designates a housing including side walls 2 and having a cover 3 provided with a sight opening 4., 5 and 6 designate cylinders rotatably supported in the housing. 7 designates a strip of flexible material such as tough paper, which for my present purposes, is provided with longitudinally distributed indicia such as the signs 8, 9 and 10 indicating towns, and constituting the strip a map, the opposite ends of the map being secured to the cylinders by suitable means later described. Rods or rollers 11 parallel with the cylinders are rotatably supported from the housing adjacent the upper edge thereof and adjacent opposite ends of the housing, and the map passes over the rollers and is thus extended in a relatively long horizontal plane adjacent the sight opening 4. A thumb wheel 12 mounted on the outer end of one of the cylinders, for example the cylinder 6, has a larger diameter than the cylinder and extends through a slot 13 of the cover 3 so that it may be frictionally operated for rotating the cylinder 6 to wind the map thereon. A resilient belt 14 runs on pulleys 15 and 16 on the outer ends of the two cylinders, whereby rotation of the thumb wheel 12 will cause the two cylinders to rotate synchronously and the map may be wound in either direction from one cylinder to the other selectively.

A bar 17 mounted in the cover for fixed support with reference to the housing extends transversely across the sight opening at a convenient position for indicating a line transverse to the course of the aviator, and a clip 18 comprising a pointer slidable on the bar may be fixed at a desired position thereon by a thumb screw 19.

The map is further provided for my purposes with a line 20 installed on the map to indicate the predetermined course of the aviator, between a starting point and a destination, the line not necessarily extending parallel with the side edges of the strip and usually extending angularly to the side edges of the map.

The map may therefore be moved correspondingly to the progress of the aviator over the ground and the indicating clip may be shifted to register with a point on the map and assist in quick visual detection of digressions from the course, degrees of digression, and distances from other points on the map.

I further provide for constant movement of the map by means of a motor represented by the housing 21 and actuated by suitable source of energy, for example a spring, the shaft 22 of the motor extending outwardly from the housing 1 and being provided with a key 23 whereby the spring may be wound to store up energy for moving the cylinders. The motor may be geared to the cylinders through a gear train such as the pinion 24 on the motor shaft, a shaft 25 having a worm 26 and rotated from the pinion 24, a gear 27 on the cylinder 6 meshed with the worm and engaging the cylinder 6 through a star clutch member 28 so that the cylinder may be rotated from the thumb wheel 12.

I further provide means for indicating the speed at which the plane is moving with reference to points on the ground, including preferably a shaft 29 supported from brackets 30 and 31 fixed to the housing and having a worm 32 meshed with a pinion 33 driven from a bevel gear 34 on the shaft 25, whereby the shaft 29 is rotated at a faster rate than the cylinders. A governor 35 is mounted on the shaft 29, comprising a collar 36 keyed to the shaft, a collar 37 slidable on the shaft and weights 38 mounted on flexible strips 39 having outer ends attached to the collars. A disk 40 is fixed to the collar 37, and a brake 41 pivotally mounted on a pin 42 supported from a bracket 43 has a shoe 44 adapted to engage the disk for controlling the spreading movement of the governor weights by limiting the movement of the collar 37 toward the collar 36.

The brake member 41 is provided with a laterally extending arm 45, and a vertical screw 46 engaged in an opening 47 of the cover bears against said arm, and is operable by a button 48 to depress the arm and shift the shoe laterally for adjusting the position of the shoe and controlling the expansion of the governor. A spring 49 having opposite ends secured to the cover and the arm of the brake tends to lift the arm to cause the brake to pivot and thus assure contact of the screw with the brake arm, and assure control by the screw of the position of the shoe.

I further provide a circularly disposed scale 50 on the cover adjacent the screw opening, comprising graduations 51 and identifying numerals 52 representing ground speed in miles per hour. An indicating finger 53 extends radially from the screw over the upper face of the cover for registry with the graduations, so that when the screw is rotated to move the brake shoe, the governor will be controlled to limit the speed of the cylinders and map to a speed corresponding to the ground speed indicated by the finger.

Means for attaching the strips to the cylinders may comprise rods 54 having slots 55 to receive the ends of the strip, grooves 56 in the cylinders to receive the rods, and handles 57 mounted on the rods for rotating the same to roll the strip and clamp the ends thereof to the cylinders.

The device being installed in an airplane, and being provided with data displaying the significant features of the landscape over which the aviator will pass, and the course being marked by a stripe, the motor is started when the aviator rises from the field.

The aviator estimates the wind, notices his air speed and sets the indicating finger of the device at a point on the scale for regulating the speed of the map proportionately to his estimate of the influence of the wind on his air speed.

Supposing that the aviator was bound from a point "A" to destination "Z", 150 miles, and upon taking the air estimates his ground speed at 100 miles an hour and set his indicator finger at 100 miles on the scale. When he reaches an intermediate point, and observes that the map has not moved far enough to cause the clip to register with the point on the map, he may move the indicator to increase the speed of the map, so that the map will move at a rate more nearly corresponding to his actual ground speed.

Successive adjustments will thus produce synchronization of the movement of the map with the travel for the airplane in relation to the ground.

The bar 17 extending transversely of the path of the map provides a guide to indicate longitudinal lines on the map and facilitate the identification of location. An aviator may for example, set the clip at a point spaced laterally from the course indicating stripe representing the actual position at a particular moment and the relation of the clip to the stripe will indicate the degree of diversion necessary to reach the course.

A strip may be taken from an ordinary map for mounting in the housing, the course noted thereon, and a scale provided corresponding to the proportions of the scale of the map.

What I claim and desire to secure by Letters Patent is:

1. A ground speed indicator for aircraft, a support, a map movably carried by the support, a motor for moving the map, an indicator comprising a bar extending transversely of the map for defining transverse lines thereon, an indicator slidable on the bar for registry with points on said transverse line, means for controlling the speed of the map independently of the speed of said aircraft, and means including a scale for measuring the speed of movement of the map with reference to the indicator.

2. In a ground speed and course indicator including a frame and a map movable on the frame, a bar mounted on the frame transversely to the direction of movement of the map, and an indicator movably mounted on the bar.

3. A ground speed and course indicator including a support, a map movable on the support and provided with point-identifying symbols and a stripe connecting selected symbols, a bar fixed to the support and extending transversely of the direction of movement of the map, and an indicator movable on the bar.

4. In a ground speed and course indicator for aircraft including a frame and a support movable on the frame, a map on the support having longitudinally and laterally spaced point-identifying symbols and provided with a course-indicating line arranged in predetermined relation with said symbols, and a position indicator mounted on the frame and movable at right angles to the direction of movement of the support.

5. In a ground speed and course indicator for aircraft or the like including a frame, a chart, and means for moving the chart on the frame, means having predeterminad relation with the chart for indicating the course of the aircraft, and means on the frame adjustable to indicate points on said course indicating means.

6. In a device of the character described including a frame, and a constantly rotating shaft supported by the frame, a governor mounted on the frame and having driven relation with the shaft, a scale on the frame, a brake for controlling the governor, and a rotative stem for operating the brake and having an indicating finger registerable with graduations of the scale to indicate rate of movement of said shaft.

7. In a ground speed and course indicator for aircraft including a frame, a map, and means including a constantly rotating shaft for moving the map on the frame, a second shaft having driven relation with the map moving shaft, a governor on the second shaft, a brake for controlling the governor, means including a screw threaded in the frame for operating the brake, a scale on the frame having graduations in terms of ground speed of the aircraft, and a finger on the brake operating means registerable with said graduations upon rotation of the screw for indicating ground speed of the aircraft.

8. In a ground speed indicator for aircraft including a frame, a map, and means for moving the map on the frame, a scale on the frame having graduations in terms of ground speed of the aircraft, and means controlling rate of movement of the map including a member having driven relation with the map moving means, and means for controlling said member having a finger movable over said scale.

In testimony whereof I affix my signature.

HOMER L. BREDOUW.